United States Patent [19]

Eblen

[11] 4,215,821

[45] Aug. 5, 1980

[54] FUEL INJECTION NOZZLE

[75] Inventor: Ewald Eblen, Stuttgart, Fed. Rep. of Germany

[73] Assignee: Robert Bosch GmbH, Stuttgart, Fed. Rep. of Germany

[21] Appl. No.: 882,828

[22] Filed: Mar. 2, 1978

[30] Foreign Application Priority Data

Mar. 16, 1977 [DE] Fed. Rep. of Germany ....... 2711390

[51] Int. Cl.² .............................................. F02M 61/04
[52] U.S. Cl. ............................... 239/533.4; 239/533.8; 239/563
[58] Field of Search ............. 239/533.3–533.12, 239/562, 563

[56] References Cited

U.S. PATENT DOCUMENTS

| | | | |
|---|---|---|---|
| 1,607,805 | 11/1926 | Sprado | 239/563 X |
| 1,834,061 | 12/1931 | Joachim | 239/563 X |
| 3,339,848 | 9/1967 | Geiger | 239/533.4 X |
| 3,633,823 | 1/1972 | Steiger | 239/533.8 X |
| 3,831,863 | 8/1974 | Fenne | 239/533.8 |

FOREIGN PATENT DOCUMENTS 792775  4/1958  United Kingdom ................. 239/533.5

*Primary Examiner*—Andres Kashnikow
*Attorney, Agent, or Firm*—Edwin E. Greigg

[57] ABSTRACT

The invention relates to fuel injection nozzles for internal combustion engines provided with a nozzle body one end of which includes plural fuel injection spray apertures with plural telescopable valve needles slidably positioned in the nozzle body and arranged to control feed to the spray apertures. At least one valve needle is controllable by an adjusting piston subjected to fuel supply and plural pressure chambers associated with the respective valve needles permits pressurized fuel supply to successively lift the valve needles independently of the other away from the spray apertures in the nozzle body.

7 Claims, 1 Drawing Figure

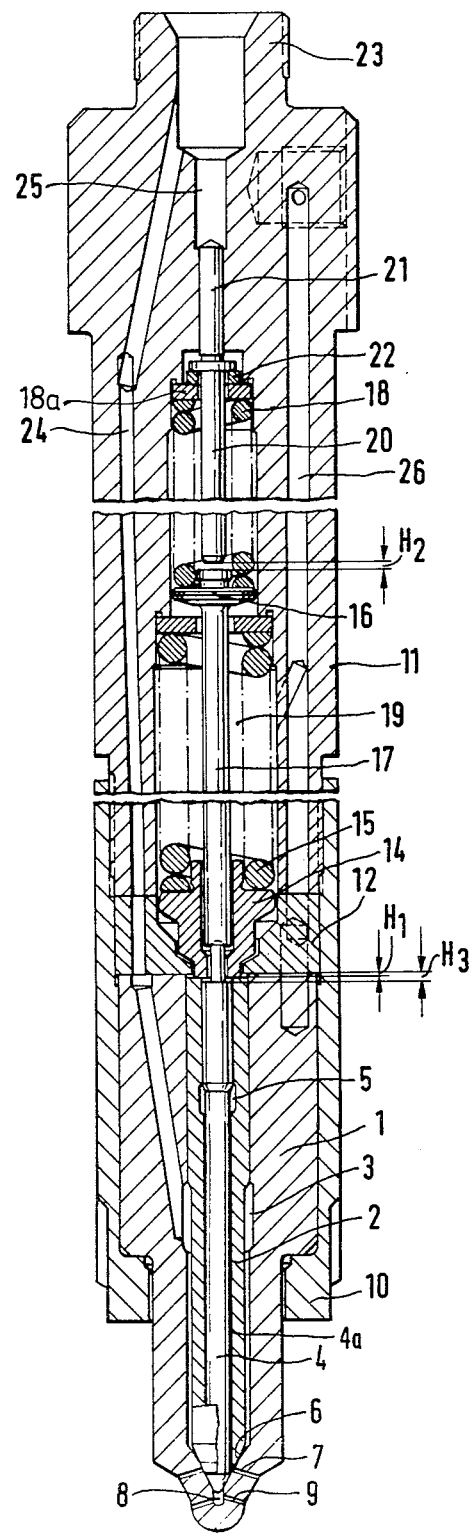

FUEL INJECTION NOZZLE

BACKGROUND OF THE INVENTION

The invention relates to a fuel injection nozzle, and more particularly a fuel injection nozzle for use in internal combustion engines, that is provided with a valve needle that opens against a closing spring and thus is adapted to control at least a first injection opening, and which can also be loaded in the direction of closing by an adjusting piston that is acted upon by the fuel supply. In a known fuel injection nozzle of this type a pin, which is arranged on the valve needle projects into an injection opening, so that the injection cross section does not change despite a stroke of the valve needle that is dependent on the required performance. In many engines, especially in direct injection engines, it is advantageous when an enlargement of the injection cross section takes place from idling toward full-load, whereby preferably the injection angle should also be changed.

OBJECT AND SUMMARY OF THE INVENTION

The invention relates to a fuel injection nozzle with a first valve needle, which is acted upon in the closing direction by an adjusting piston that is acted upon by the fuel supply, and with a second hollow valve needle that telescopes the first valve needle. The first valve needle and the second hollow valve needle control separate injection openings in the nozzle.

The fuel injection nozzles according to the present invention has the first advantage that the cross section enlarges with the increase of the supplied quantity of fuel and second, there is a balancing or coordination that takes place by means of the changeable pressure. In addition, the adjusting piston takes over part of the force acting in the closing direction, so that the corresponding spring can be formed relatively small, thereby saving space.

A further object of the present invention is to provide independent spring elements for cooperation with the first and second valve needles.

Still another object of the invention is to provide independent pressure chambers for cooperation with each of said valve needles.

The invention will be better understood as well as further objects and advantages thereof become more apparent from the ensuing detailed description of a preferred embodiment taken in conjunction with the drawing.

BRIEF DESCRIPTION OF THE DRAWING

One exemplary embodiment of the object of the invention is shown in the single FIGURE of the drawing in longitudinal section and is described in greater detail in the following specification.

DESCRIPTION OF THE PREFERRED EMBODIMENTS

Turning now to the drawing, a hollow valve needle 2 shown in cross section is radially sealed in a nozzle body 1 and together with the nozzle body 1 it defines a pressure chamber 3. A valve needle 4 reciprocably positioned in the hollow needle 2 is also radially sealed and arranged for axial movement in said hollow needle. The hollow neddle 2 and a valve needle 4 define a pressure chamber as shown at 5. The nozzle body 1 is provided with a valve seat 6, and injection openings 7 which communicate therewith, are controlled by the terminus of the hollow needle 2. Also it will be noted that the valve needle 4, on the other hand, controls the passage 4a from the pressure chamber 5 to a blind bore 8 and from which injection openings 9 branch off, as shown.

The nozzle body 1 is assembled with a nozzle holder 11 by a cap screw 10. An intermediate apertured plate 12 is disposed between the nozzle body 1 and the nozzle holder 11. The hollow needle 2 is spring loaded, as shown at 15, by means of an axially perforated spring plate 14. The valve needle 4 is loaded by a closing spring 18 by means of a spring support element 16 and a spacing mandrel 17 which is positioned beneath the spring support element 16. The spring 18 encompasses a coaxially extending adjusting piston 20 which is arranged so that its end opposite the spring chamber 19 is radially sealed and axially movable in the nozzle holder. The upper portion of the closing spring 18 abuts an annulus 18a which in turn is supported against the stop means 22 provided within the nozzle holder 11 and this is the means by which the original position of the adjusting piston 20 is determined.

The fuel supplied from a fuel injection pump, not shown, travels in the usual manner through the threaded connecting support 23 into a pressure line 24 of the fuel injection nozzle which, in turn, leads to the pressure chamber 3 of the hollow needle. In addition, the pressurized fuel flows through a bore 25 into contact with the upper extremity 21 of the adjusting piston 20. The spring chamber 19 is relieved of pressure by means of a leakage channel 26.

OPERATION

The described fuel injection pump operates as follows: When the fuel from the injection pump flows through the pressure line 24 into the pressure chamber 3 of the hollow needle and the supply pressure is ample, the hollow needle is lifted from its valve seat 6 so that fuel is permitted to be injected through the injection openings 7. The hollow needle 2 thereby completes a stroke $H_1$ and strikes the intermediate apertured plate 12 which functions as a stop for the hollow needle 2. When there is a further increase in the quantity of fuel supply and a subsequent further increase of the opening pressure is also effective in the pressure chamber 5 of the valve needle 4, then this needle too is lifted from the valve seat 6 and permits connection of the blind bore 8 with the pressure chambers 3 and 5 so that fuel is also injected through the injection openings 9. During this stage of operation of the injection nozzle, the valve needle 4 completes the stroke $H_2$ against the force of the closing spring 18 and the spacing mandrel 17, which is provided with the spring support element 16, strikes the lower terminal portion of the adjusting piston 20. When there is a further increase of the pressure of the fuel, depending on the coordination of the cross section of the end 21 of the adjusting piston to the cross section of the guided section of the valve needle 4 and the force of the spring means 18, the valve needle 4 is pushed further in the opening direction, until it strikes the stop means formed by the spring plate 14 of the hollow needle 2 after completion of the entire stroke $H_3$. It will be readily appreciated that if the valve needles are opened in two stages as explained, said two-stage opening being dependent on the delivery rate of the fuel; in other words, by adapting the injection cross section, a good atomization is attained. When there is a further increase of the delivery rate, the injection cross section does not change but the pressure and thereby the fuel spreading is improved. Naturally, the cross section of the injection openings 7 and 9 is primarily adapted to the respective delivery rate, so that even at small quantities, particularly during idling, a sufficient atomization takes place and on the other hand, during full-load and the maximum delivery rate, a sufficient quantity of fuel in injected through the entire passage cross section.

It is of course conceivable, that the configuration of the adjusting piston 20 can be selected in such a manner that it acts on the hollow needle 2 or that the springs 18 and 15 also act successively on one of the two needles.

In delivering fuel first into the pressure chamber 3 and then after a lifting of the hollow needle 2, into the pressure chamber 5, the closing order must also be regulated accordingly, in that namely, first the valve needle 4 closes, and then the hollow needle 2 contacts the valve seat. However, it is also possible for the reverse to be true, i.e. that the fuel arrives at the outset in the pressure chamber 5 and the opening order is determined only by the force of the spring, or by the relationships between the surfaces of the adjusting piston and the valve needles.

The foregoing relates to a preferred exemplary embodiment of the invention, it being understood that other embodiments and variants thereof are possible within the spirit and scope of the invention, the latter being defined by the appended claims.

What is claimed and desired to be secured by Letters Patent of the United States is:

1. A fuel injection nozzle for internal combustion engines comprising a nozzle body provided with a first valve needle that opens against a closing spring and thereby adapted to control at least a first injection opening, said first valve needle, when at least partly opened, being arranged to be further loaded in the direction of closing by an adjusting piston that is continuously acted upon by the instantaneous pressure of the fuel being supplied at all times, said further loading being iniated at a predetermined position of said first valve needle, further characterized wherein said fuel injection nozzle has a second valve needle which controls at least a second injection opening and said second valve needle is formed as a hollow needle that encompasses the first valve needle.

2. A fuel injection nozzle according to claim 1, wherein said second hollow needle is loaded by an independent closing spring.

3. A fuel injection nozzle according to claim 1, wherein said nozzle body and said second valve needle have a pressure chamber provided therebetween.

4. A fuel injection nozzle according to claim 1, wherein said first and second valve needles have a pressure chamber provided therebetween.

5. A fuel injection nozzle according to claim 1, wherein said first and second valve needles control separate injection ports in said nozzle body.

6. A fuel injection nozzle according to claim 1, wherein the second valve needle is associated with a spring support plate that serves as a stop for the first valve needle.

7. A fuel injection nozzle for internal combustion engines, which comprises:

a nozzle body defining a longitudinally extending first passage, a valve seat at one end of the first passage, fuel supply means for admitting pressurized fuel to the first passage adjacent an outer portion of the valve seat, a first injection opening adjacent an inner portion of the valve seat, and a second injection opening through the valve seat;

first and second valve needles, longitudinally movable between respective closed and fully open positions, the first valve needle being slidably disposed within and guided by a longitudinally extending second passage defined by the second valve needle and the second valve needle being slidably disposed within and guided by the first passage, the first and second valve needles including respective surfaces against which a force is applied by the pressurized fuel to move the valve needles in an opening direction, one end of the second valve needle engaging the outer portion of the valve seat when the second valve needle is moved into its closed position to prevent fuel flow from the fuel supply means to the first valve needle and to the first and second injection openings, and one end of the first valve needle engaging the inner portion of the valve seat when the first valve needle is moved into its closed position to prevent fuel flow from the fuel supply means to the first injection opening;

first spring means for biasing the first valve needle in its closing direction;

second spring means for biasing the second valve needle in its closing direction; and an adjusting piston, slidably disposed within the nozzle body for longitudinal movement between a first position and a second position, one end of the adjusting piston being continuously acted upon by the pressurized fuel in a direction to move the adjusting piston to its first position, the adjusting piston having an opposite end which, when the adjusting piston is disposed in its first position, is engaged by an opposite end of the first valve needle at a predetermined position of the first valve needle intermediate its closed and fully open positions, as the first valve needle is moved toward its fully opened position, whereafter the adjusting piston exerts a force on the first valve needle in its closing direction which is proportional to the pressure of the pressurized fuel in addition to the force exerted on the first valve needle in its closing direction by the first spring means, as the first valve needle is moved from its predetermined intermediate position toward its fully open position, and also as the first valve needle is moved toward its predetermined intermediate position away from its fully open position.

* * * * *